(12) United States Patent
Macrae et al.

(10) Patent No.: US 8,137,197 B2
(45) Date of Patent: Mar. 20, 2012

(54) SYSTEM AND METHOD FOR GENERATING TARGETED NEWSLETTERS

(75) Inventors: Douglas Macrae, Weston, MA (US); Thomas Westberg, Stow, MA (US); John O'Keefe, Stow, MA (US)

(73) Assignee: 38 Studios, LLC, Providence, RI (US)

( * ) Notice: Subject to any disclaimer, the term of this patent is extended or adjusted under 35 U.S.C. 154(b) by 1235 days.

(21) Appl. No.: 11/764,788

(22) Filed: Jun. 18, 2007

(65) Prior Publication Data

US 2008/0004122 A1    Jan. 3, 2008

Related U.S. Application Data

(60) Provisional application No. 60/814,164, filed on Jun. 16, 2006.

(51) Int. Cl.
*A63F 9/24* (2006.01)
(52) U.S. Cl. ............... 463/42; 463/40; 705/16; 705/20
(58) Field of Classification Search ............ 463/25–42; 705/16, 20
See application file for complete search history.

(56) References Cited

U.S. PATENT DOCUMENTS

| 6,186,893 | B1 * | 2/2001 | Walker et al. | 463/20 |
| 2005/0246638 | A1 * | 11/2005 | Whitten | 715/708 |
| 2006/0129451 | A1 * | 6/2006 | Kohanim et al. | 705/14 |
| 2006/0135233 | A1 * | 6/2006 | Willis et al. | 463/1 |
| 2006/0148573 | A1 * | 7/2006 | Willis et al. | 463/43 |
| 2006/0287106 | A1 * | 12/2006 | Jensen | 463/42 |
| 2007/0072676 | A1 * | 3/2007 | Baluja | 463/42 |
| 2007/0184902 | A1 | 8/2007 | Liu et al. | |
| 2007/0191103 | A1 * | 8/2007 | Van Luchene | 463/42 |
| 2008/0146342 | A1 * | 6/2008 | Harvey et al. | 463/42 |
| 2008/0254886 | A1 * | 10/2008 | Kelly | 463/42 |

OTHER PUBLICATIONS

International Search Report for Application No. PCT/US07/71494 filed Jun. 18, 2007, dated Aug. 28, 2008, mailed Sep. 15, 2008, 2 pages.
Written Opinion for Application No. PCT/US07/71494 filed Jun. 18, 2007, dated Aug. 28, 2008, mailed Sep. 15, 2008, 5 pages.

* cited by examiner

*Primary Examiner* — Masud Ahmed
(74) *Attorney, Agent, or Firm* — Rajesh Vallabh; Foley Hoag LLP

(57) ABSTRACT

A system and a method of providing a targeted newsletter is provided. The method includes monitoring a game while a game player plays the game on a game computer, collecting game related information, uploading the game related information to a remote server, generating a newsletter on the remote server that is tailored for the game player based on the game related information, and transferring the newsletter to the game player.

22 Claims, 2 Drawing Sheets

SYSTEM AND METHOD FOR GENERATING TARGETED NEWSLETTERS

CROSS-REFERENCE TO RELATED APPLICATION(S)

This Patent Application claims the benefit of U.S. Provisional Patent Application Ser. No. 60/814,164, filed on Jun. 16, 2006 and entitled "TARGETED NEWSLETTER," the entire content of which is hereby expressly incorporated by reference.

BACKGROUND OF THE INVENTION

1. Field of the Invention

The present invention relates to a newsletter, and more particularly, to a newsletter targeted to a particular game player and customized based on information related to the particular game player's character.

2. Description of Related Art

Internet-based role-playing games have become increasingly complex. In order to play the game effectively, game players must spent much time playing the game and researching the game to learn particular details of the game that may be deliberately obscure or not repeated frequently. Popular games such as EverQuest® and World of Warcraft™ have spawned Internet websites which support this research, offering database lookups of game facts (e.g., valuable game items or things to do) as well as online forums in which game players may contribute their experiences on how to best play the game. EverQuest® is a registered trademark of Sony Online Entertainment LLC. World of Warcraft™ is a trademark or registered trademark of Blizzard Entertainment, Inc.

As with much of the Internet, for many people there is too much information to sort through. In addition, a comprehensive search on the Internet requires a significant time investment, even with search engines. Furthermore, a less experienced gamer may not know for what terms to search.

Accordingly, there is a need for concentrated advice content about the game, delivered to players in a useful form, such as a magazine or a website. The problem with providing such advice via a magazine or a website is that game players have to sift through information unrelated to their character, their character's level, or their character's position or location. Such games may be very complex and therefore there may be an abundance of information to provide to game players, with much of the information not being useful to any particular game player at a particular time. In World of Warcraft™, for example, players start out the game at experience Level 1 and work their way to Level 70. Progressing through these levels can take several weeks of online playtime (and months of real time). At different levels of game play, the player is presented with different game challenges with experience gained in the first few levels being built upon to be used for higher level play. Players at Level 40 are not generally interested in advice to players at Level 5, while Level 5 players may not remember advice given them for Level 40 play by the time they achieve that level. Adding further complication (and to add to replayability for the game designers), role-playing games offer the ability to choose a character class (often from a fantasy genre, such as a Warrior or a Mage). Playing the game as one class can be a very different experience from that of another class. Beyond the complexity faced by players as they progress through a game, online games often add content throughout a game's lifetime in order keep player interest high.

To summarize, offering all of the available information known about game play leads to an encyclopedic database, requiring considerable research efforts on the part of the player, while offering occasional articles from scattered types of game play will have a very low hit rate on article relevance, and in some cases may be out of date.

Accordingly, there is a need for a focused presentation of information game players seek that is delivered to the game players without the game players having to conduct a search.

SUMMARY OF THE INVENTION

A method of providing a targeted newsletter is provided. A game is monitored while a game player plays the game on a game computer. The game player is allowed to select characters for which the game player would like to receive advice. Game related information is collected from the game. The game related information includes at least one of the group consisting of a character's name, level, race, class, stats, status, talents, gold, equipment, spells, professions, current location, and an event in the game. The game related information is stored in a character data file on the game computer. The game related information is read from the character data file. A request is made to upload the game related information to a remote server. The requester is notified whether the game related information may be uploaded based on a load on the remote server. The game related information is uploaded to the remote server. The game related information is stored to a character subscriber database on the remote server. The game related information is read from the character subscriber database. A determination is made whether to transfer a newsletter based on time, elapsed time since a newsletter has been sent, the game related information, or upon determining that the game player needs guidance. Articles are retrieved from an article database based on the characters that the game player selected and on the game related information. A determination is made whether the game player has read any of the retrieved articles and whether the game player has not heeded advice contained in the retrieved articles that have been read. The newsletter is generated on the remote server that is tailored for the game player based on the game related information and based on which characters the game player selected to receive advice. The game related information and the retrieved articles are incorporated into the newsletter. The retrieved articles that have been read by the game player are not incorporated in the newsletter unless the game player has not heeded advice contained in the retrieved articles that have been read by the game player. The newsletter is transferred to the game player. Transferring the newsletter to the game player includes e-mailing the newsletter or hyperlinks to the newsletter to the game player; uploading the newsletter or hyperlinks to the newsletter directly to the game computer; allowing the newsletter or hyperlinks to the newsletter to be downloaded onto the game computer; or making the newsletter available over a website.

A system for preparing a targeted newsletter is provided. The targeted newsletter system includes a monitor program running on a game computer that collects game related information during a game while a game player plays the game and stores the game related information in a character data file on the game computer. The targeted newsletter system also includes an interface for allowing the game player to select characters for which the game player would like to receive advice. The targeted newsletter system further includes a client uploader program running on the game computer that reads game related information from the character data file; requests to upload the game related information to the remote server; and uploads the game related information to a remote server. The targeted newsletter additionally includes an upload handler running on the remote server that informs the client uploader program whether the game related information may be uploaded based on a load of the remote server; receives the game related information from the client uploader program; and stores the game related information in a character subscriber database on the remote server. Furthermore, the targeted newsletter includes a newsletter generator running on the remote server that reads the game related information in the character subscriber database; determines whether to transfer the newsletter based on time, elapsed time since a newsletter has been sent, the game related information, or upon determining that the game player needs guidance; retrieves articles from an article database based on the game related information and on the characters the game player selected; determines whether the game player has read any of the retrieved articles and whether the game player has not heeded advice contained in the retrieved articles that have been read; creates a newsletter that includes the articles or hyperlinks to the articles that have not been read by the game player or that contain advice that the game player has not heeded; incorporates the game related information into the newsletter; and transfers the newsletter to the game player by e-mailing the newsletter or hyperlinks to the newsletter to the game player; uploading the newsletter or hyperlinks to the newsletter directly to the game computer; allowing the newsletter or hyperlinks to the newsletter to be downloaded onto the game computer; or making the newsletter available over a website. The game related information includes at least one of the group consisting of a character's name, level, race, class, stats, status, talents, gold, equipment, spells, professions, current location, and an event in the game.

DETAILED DESCRIPTION

A solution for providing game related information to game players is to provide a set of advisory articles offered a few at a time, but only provide articles that are relevant to the player's current in-game character type and level. Such game related information could be provided in a periodic newsletter customized to the player's current situation. In one approach, the player may sign up for the newsletter as a particular character type and level (perhaps a Warlock at Level 8), and the newsletter for Warlocks can be sent periodically, at increasing levels. Such approach would lack synchronization and would quickly become frustrating, as the newsletter would either lag behind or run in advance of the player's progress. In a second approach, the player could use a controlling website to ask for new newsletters as the player progresses. The second approach would provide more synchronized information, but is likely to miss items if the player does not remember to do queries.

According to an exemplary embodiment of the present invention, another approach is to instrument the game itself with a small monitor, which captures the player's game state and significant play events, and uploads the data periodically to a newsletter server. The newsletter server handles the upload, saves the data representative of the player's progress, and periodically (based perhaps on elapsed time, progress in the game in some way, or both) generates a newsletter targeted at that player's current situation in the game.

Figure 1:
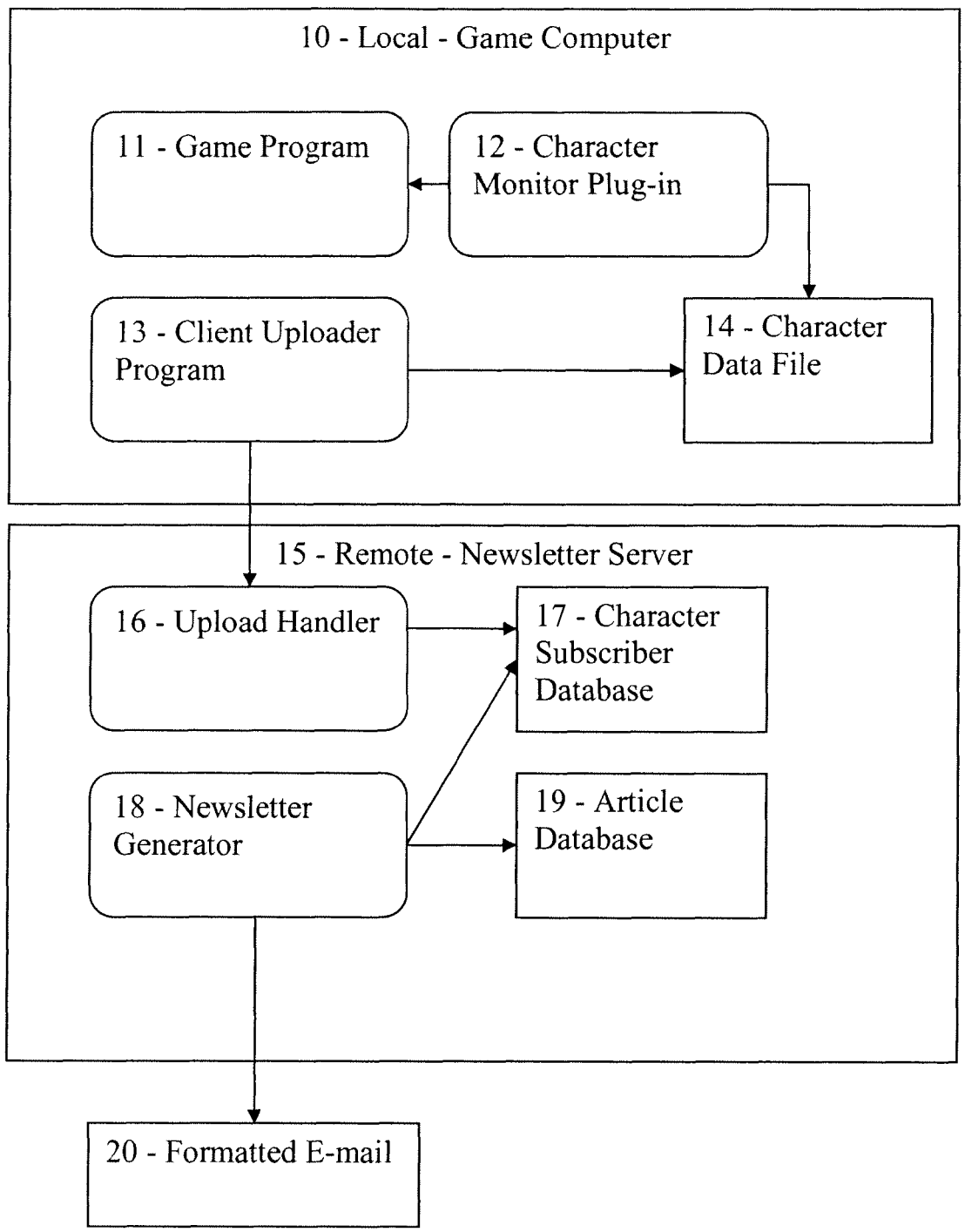
FIG. 1 is an implementation diagram of a targeted newsletter according to an exemplary embodiment of the present invention.

Such an approach is diagrammed in FIG. 1. As depicted in FIG. 1, the game 11 runs locally on the game computer 10. A character monitor plug-in 12 gathers a player's character information from the game program 11 and stores the information in a character data file 14. The character monitor plug-in 12 may gather and store a range of information including a character's name, level, race, class, stats, status, talents, gold, equipment, spells, professions, and current location. The character monitor plug-in 12 may gather and store any additional information that may help define game related information that players would seek such as significant play events. The client uploader program 13 periodically reads the character data file 14 and uploads the data to the upload handler 16 on the remote newsletter server 16. The upload handler 16 stores the data in a character subscriber database 17 on the newsletter server 15. The newsletter generator 18 reads the data from the character subscriber database 17 and determines whether to generate a newsletter to the particular subscriber/gamer. The newsletter generator 18 may make this determination based on level (e.g., odd numbered levels), timing such as weekly or biweekly, the player's character's particular position or location in the game or other character related information, or based on some other event such as encountering a new creature or a difficult battle, or after making a determination that the player needs guidance after spending a significant amount of in-game time in a particular location or without having achieved an upgrade in level. If the newsletter generator 18 determines that a newsletter should be sent, the newsletter generator 18 pulls articles from the article database 19 based on the data obtained in the character subscriber database 17, generates a formatted e-mail 20 with the information from the article database 19 and the obtained data, and sends the e-mail to the particular subscriber/gamer.

As discussed above, the newsletter generator 18 picks available articles from the article database 19 that matches the filter criteria of the player's character data stored in the character subscriber database 17. For example, a Level 8 Warlock would receive a newsletter composed of articles which are relevant to Warlocks who are in a level range including Level 8. The newsletter could consist of advice typical of new Warlocks (e.g., the best spells to use in difficult situations) or advice specific to the region of the game world in which the character is located (e.g., advice to visit a Warlock trainer upstairs in the Inn).

Some articles could cover a wide range of interest, either across character types or levels; others could be much more closely focused. After a given article or articles are chosen for the newsletter, the newsletter may have scripting language embedded which further customizes the text to the player, much in the way of mail merges (e.g., "Dear Grumblefitz, as a Dwarf Warlock, you should . . . "). In addition, the newsletter may contain a snapshot of attributes related to the current character such as level, gold, location, and the like.

In addition, the newsletter may contain advice about a particular player's style. For example, if a particular ability is available to the player, but the player never uses the ability (and use of the ability would help the player's progress), a small reminder article might be generated such as "I notice you don't use the Tome of Ungrackling. This is a powerful ability which can get you out of trouble when fighting the Grackles near . . . "

Online role-playing games often base their play around quests which require a certain set of actions from the player in return for a specific reward. Quests have a range of difficulty, and those which are too difficult or too easy (and hence would have no reward) would not be recommended to the player's character given his current level. In addition, some quests are quite difficult for a character's current level, but may be worth pursuing because the reward (an especially nasty sword, for example, that a Warrior would like) is especially good for the character class. These criteria are taken into account in selecting advice articles for the newsletter.

The game "worlds" of online role-playing games are large in the sense that it can take a significant amount of real-world time for a character to "walk" or "ride" or otherwise travel from one end to the other end of the game "worlds." As a result, in order to provide pertinent and useful information, advice to players should be relevant to items near the character's current location, or advice should specifically explain why it is worth going to a distant area. In addition, the advice may include directions (both textual and graphical) for the travel, along with warnings of particularly difficult areas to transit.

While some gameplay information is best conveyed in text-based articles, other information is best conveyed graphically, showing spacial relationships of objects in the game. Simply showing a map, however, is not always a good choice. In some zones, there may be 200 or more Non-Player Characters ("NPCs", controlled by the game, with which the player may need to interact). Displaying all of them on a map of a zone would be information overload. Accordingly, in many embodiments, in addition to articles relevant to the character, a custom map is provided. The custom map is a graphical map of the zone or subzone in which the player's character was located at the time of the last update to the character subscriber database 17. The custom map also includes a number of distinguishable markers, such as letter markers, showing the location of important NPCs and locations (locations of items, buildings, or other point of interest). Also included on the custom map is a legend that identifies the NPC or significant location located at the various markers. However, as with articles, whether an NPC or item is important depends on the specific character, including the character's type, items it has, progress made on particular quests, etc. Thus, the markers and legends on the custom maps included in newsletters for different players will generally be different.

In many embodiments, in addition to showing the location of important NPCs and locations, the custom map also shows the location of the player's character based on the information in the character subscriber database 17.

To generate the custom maps, information for all known NPCs and all significant locations is stored in a map database (not shown). This map database may be part of article database 19 or a separate database located on or accessible by the newsletter server 15. NPCs have a tag (such as "Mining Trainer" or "Weapon Master") which describes their capabilities. Significant locations may have tags as well. Character information for the character subscriber database 17 is accessed. The character's current zone is used to find a map graphic as a basis for the final map. The information for all NPCs and significant locations for this zone is also gathered from the map database.

In an example taken from Warcraft, the character information indicates the character is located in the zone, "Stormwind City." For Stormwind City, 223 NPCs are found. For each NPC, an "NPC Filter" is found, based on the NPC's tag. In the case of the NPC "Arthur the Faithful," a Paladin trainer in the "Stormwind City" example, the NPC filter is a "Paladin Trainer" filter and this filter is run for the character. This filter is an arbitrary fragment of script code, which checks arbitrary parts of the current environment to determine whether the NPC should be displayed or not. In some embodiments, the fragment of script code is in the Ruby language. In this case, the Paladin Trainer filter checks to see if the current character's class is "Paladin." If the character's class is "Paladin," the NPC's priority is set to 10. For another NPC in the Stormwind City example, "Osborn the Night Man", a Rogue Trainer script is run, and it checks to see if the character's class is "Rogue." In the case where the character's class is still "Paladin," "Osborn the Night Man's" NPC priority is set to 0, and no marker for "Osborn the Night Man" is shown on the custom map.

In a similar manner, significant locations also have filters that are run for the current character, as some locations may have varying levels of interest to a player depending on their characters status and characteristics/

Some NPC Filters set a NPC "Repair" flag for their NPC. In the Warcraft example, NPCs with repair abilities are useful to all players, and thus the NPC priority may be set at 8 for all characters with such an NPCs filter is run. The existence of such "universal" NPCs, though, illustrate a potential problem where so there are so many NPCs and significant locations remaining even after the filer process is completed, the displaying markers for each one would be too cluttered and including each NPC and significant location in the legend will make the legend too large or the printing of the legend too small.

Accordingly, after all of the filters have been run, a culling process is performed. During the culling process, NPCs with a priority at or below zero are dropped from the list. NPCs with the same repair flag that are within a given parameterizable distance from one another are consolidated; such that all but one of such a group are dropped. In some embodiments, this and other steps may be repeated with tighter or looser parameters based on the number of NPCs and significant locations that are left at the end of the culling process. NPCs that are within a parameterizable distance too each other are consolidated for the purpose of their marker (i.e., they share a letter marker), but are still each included in the legend of the custom map. The parameter used to determine whether NPCs will share a marker may be based on the scale of the particular map being used for the custom map.

Some NPCs or significant locations, such as mailboxes or anvils in Warcraft, use special icons instead of letter-markers.

After the final list of NPCs and significant locations and their markers are determined for the custom map, the graphics for the markers are overlayed on the map graphic by the server, and their information is included in the legend table. The resulting graphic image is saved into the server's file system and the newsletter itself receives a reference to the graphic (e.g., an HTML "<img>" tag), followed by an HTML table which displays the legend mapping NPC names, tags, and letter-markers.

In some embodiments, in addition to custom maps, special "starting zone" maps are constructed. These maps are tailored for when a player's character first enters a new zone for the first time. In many instances, these starting zone maps are zoomed-in viewports of a major zone map. In many instances, the starting zone maps are the same for all characters or a subset of character types. In other instances, the starting zone maps are as custom as the other custom maps.

In some embodiments, the newsletter server generates a special "map edition" which displays only the starting zone map for a zone the player's character enters. This limited newsletter is sent regardless of the normal rules determining when to generate a new newsletter, only determined by the player's character's discovery of a new zone.

In addition to choosing content relevance based on a player's current (and past) game state, the newsletter generator 18 would keep track of which articles have been "seen" by, "read" by, or at least sent to a player and avoid sending duplicate articles. Particularly in the implementations where the system tracks which articles are "seen" or "read" by the player, articles that are determined to be of particular relevance to that player may be intentionally resent in a later newsletter if the article was not seen or read when it was included in the earlier newsletter. In another alternative, if the player's current and historical game states and other uploaded game data indicate that they have not heeded advice contained in articles included in an earlier newsletter, articles including the advice may be included in a current newsletter even if the system has received information that the article had been previously read and/or seen.

The "seen" or "read" tracking may be accomplished in a variety of ways. If the newsletter is viewed using a newsletter viewer program running on the player's computer 10 or by web access, the viewer or web site is configured to allow the player a simple way, for each article, to indicate that they have read it (e.g., a checkbox) or it is configured to determine that an article has been "seen" after an article has been printed or displayed by the newsletter viewer program for a certain period of time. If the newsletter is sent by e-mail, the newsletter may be considered by the system to be "read" if the system receives an e-mail read receipt. Alternatively, the e-mail includes a "read" link near each article in the e-mail newsletter that sends a signal to the system via, for example, a web interface indicating the player has read the particular article. In another variation, the e-mail is an "html" e-mail that does not include the text of the articles, but rather includes links to the system's web server that fills in the text of the articles when the e-mail is viewed. These links may identify the particular newsletter/user where they are embedded, allowing the web server to track whether the articles in a newsletter e-mail have been "seen" by tracking the fill-in requests that the web server receives.

A player is the person sitting at a home computer or console, interacting with the game, while a character is the player's in-game avatar. In many online games, a player may have more than one playable character, although only one of those characters may be in the online game world at a given time. Online games often require a continuing payment, leading to the creation of a players game subscription account. The player's many characters are each linked to this game subscription. Players who wish to use a customized newsletter must also have a newsletter subscription account, which keeps track of the player's game subscription account and the states of the various characters associated with the subscription account.

As described above, as the player plays the game, a character monitor plug-in program 12 runs in the background. When the game exits, the character monitor plug-in 12 saves the current information about the player's character to the character data file 14. The character data file 14 is read by the client uploader program 13. The client uploader program 13, which runs independently of the game program 11, may read and upload the character data file 14 periodically or upon a particular event such as a modification of the character data file 14 (i.e., changed creation date) or an exiting of the game program 11 process. The client uploader program 13 uploads the contents of the character data file 14 to the upload handler 16 running on the newsletter server 15. The character data is stored in a character subscriber database 17 associated with the newsletter subscriber. In an exemplary embodiment, when the newsletter server 15 is particularly overloaded, the uploader handler 16 may request that the client uploader program 13 delay the upload until the load on the newsletter server 15 has decreased.

In another exemplary embodiment, the newsletter generator 18 sends a newsletter for "lactive" characters only. A player may select which characters should be deemed "active" for the newsletter generator 18 through the client uploader program 13, through menus provided in the character monitor plug-in 12, through another program running on the game computer 10, or through a web interface on a web server 21 (FIG. 2).

Figure 2:
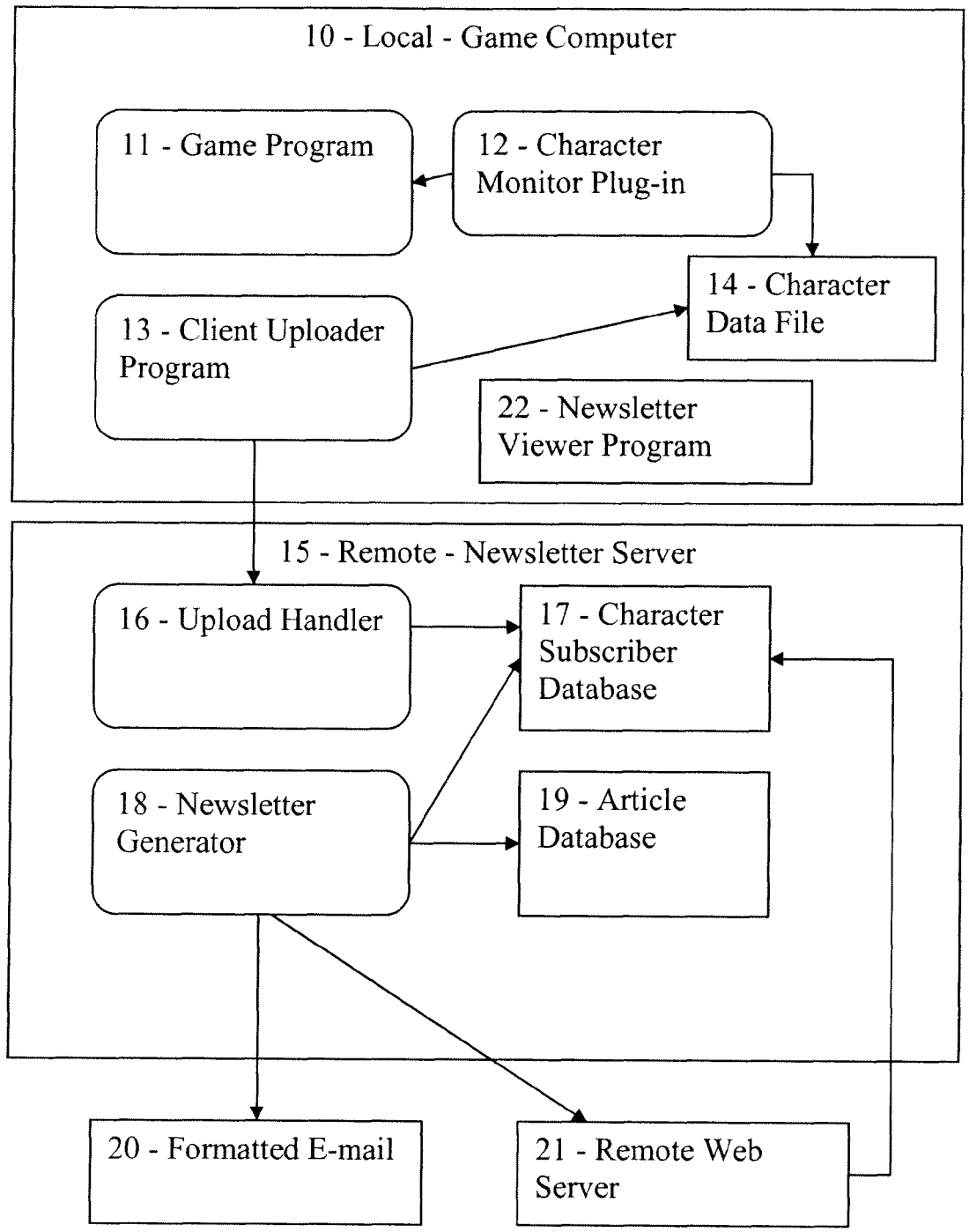
FIG. 2 is an implementation diagram of a targeted newsletter with a remote web server according to another exemplary embodiment of the present invention.

FIG. 2 is an implementation diagram of a targeted newsletter with a remote web server 21. The remote web server 21 can be the same server as the newsletter server 15 or can be a separate server for handling web access for subscribers. In an exemplary embodiment, the newsletter generator 18 generates a formatted e-mail 20 including the article text. In another exemplary embodiment, the newsletter generator 18 generates a newsletter containing hyperlinks to articles available on the web server 21. In yet another exemplary embodiment, a newsletter viewer program 22 that runs on the game computer 10 is used to view the newsletter. The newsletter viewer program 22 can either be part of the client uploader program 10, a separate program that runs on the game computer 10, the character monitor plug-in 12, or a separate plug-in for the game program 11. The newsletter is transmitted to the newsletter viewer program 22 by direct network transfer from the newsletter server 15 to the newsletter viewer program 22, by a download from web server 21, file sent by e-mail that is loaded after receipt, or other data transfer technique.

In further exemplary embodiments, the web server 21 provides the ability for particular subscribers to select which characters are being actively used and for which they would like to receive newsletters. The web server 21 may also provide the ability for subscribers to select the type of information they would like to receive. Such settings may be stored by the remote server 21 into the character subscriber database 17 so that the newsletter generator 18 may form newsletters pursuant to the settings.

Alternatively, the interface for handling the "active" setting or other settings may be located locally on the game computer 10 either through an interface in the character monitor plug-in 12, another plug-in, the client uploader program 13, the newsletter viewer program 22, or some other program or interface made available on the game computer 10. In such an embodiment, the upload handler 16 would store the settings in the character subscriber database 17.

In summary, according to exemplary embodiments, the targeted newsletter includes the character monitor plug-in 12 that works with the game program 11 itself. The character monitor plug-in 12 has the ability to watch a great many aspects of the player's world. In this virtual world, the monitoring is the equivalent of extensive electronic surveillance (although it is not a significant invasion of privacy because this is a virtual world). This sort of automatic monitoring is generally not feasible (either technically or for privacy reasons) in normal life, but is available to most online games.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A method of providing a targeted newsletter, comprising:
   monitoring a game while a game player plays the game on a game computer;
   collecting game related information from the game, the game information comprising at least one game character the player desires additional information and advice on;
   storing the game related information in a character data file on the game computer;
   reading the game related information from the character data file;
   requesting to upload the game related information to a remote server;
   notifying whether the game related information may be uploaded based on a load on the remote server;
   uploading the game related information to a remote server;
   storing the game related information to a character subscriber database on the remote server;
   reading the game related information from the character subscriber database;
   determining whether to transfer a newsletter based on time, elapsed time since a newsletter has been sent, the game related information, or upon determining that the game player needs guidance;
   retrieving articles from an article database based on the characters that the game player selected and on the game related information;
   determining whether the game player has read any of the retrieved articles and whether the game player has not heeded advice contained in the retrieved articles that have been read;
   generating the newsletter on the remote server that is tailored for the game player based on the game related information and based on which characters the game player selected to receive advice;
   incorporating the game related information and the retrieved articles into the newsletter, wherein the retrieved articles that have been read by the game player are not incorporated in the newsletter unless the game player has not heeded advice contained in the retrieved articles that have been read by the game player; and
   transferring the newsletter to the game player, wherein transferring the newsletter to the game player includes e-mailing the newsletter or hyperlinks to the newsletter to the game player; uploading the newsletter or hyperlinks to the newsletter directly to the game computer; allowing the newsletter or hyperlinks to the newsletter to be downloaded onto the game computer; or making the newsletter available over a website.

2. The method of claim 1, wherein the game related information includes at least one of the group consisting of a character's name, level, race, class, stats, status, talents, gold, equipment, spells, professions, current location, and an event in the game.

3. The method of claim 1, further comprising:
   storing the game related information in a character data file on the game computer; and
   reading the game related information from the character data file.

4. The method of claim 1, further comprising:
   requesting to upload the game related information to a remote server; and
   notifying whether the game related information may be uploaded based on a load on the remote server.

5. The method of claim 1, further comprising:
   storing the game related information to a character subscriber database on the remote server; and
   reading the game related information from the character subscriber database.

6. The method of claim 1, further comprising:
   determining whether to transfer the newsletter based on time, elapsed time since a newsletter has been sent, the game related information, or upon determining that the game player needs guidance.

7. The method of claim 1, further comprising:
   retrieving articles from an article database based on the game related information;
   determining whether the game player has read any of the retrieved articles and whether the game player has not heeded advice contained in the retrieved articles that have been read; and
   incorporating the game related information and the retrieved articles into the newsletter, wherein the retrieved articles that have been read by the game player are not incorporated in the newsletter unless the game player has not heeded advice contained in the retrieved articles that have been read by the game player.

8. The method of claim 1, wherein transferring the newsletter to the game player includes:
   e-mailing the newsletter or hyperlinks to the newsletter to the game player;
   uploading the newsletter or hyperlinks to the newsletter directly to the game computer;
   allowing the newsletter or hyperlinks to the newsletter to be downloaded onto the game computer; or
   making the newsletter available over a website.

9. The method of claim 1, further comprising:
   allowing the game player to select characters for which the game player would like to receive advice; and
   retrieving articles from an article database based also on the characters that the game player selected.

10. The method of claim 1, wherein generating a newsletter comprises generating a newsletter that includes a custom map that includes identifiers for locations chosen for the game player based on the game related information.

11. A method of providing a targeted newsletter, comprising:
    monitoring a game while a game player plays the game on a game computer;
    allowing the game player to select characters for which the game player would like to receive advice; and
    collecting game related information from the game, wherein the game related information includes at least one of the group consisting of a character's name, level, race, class, stats, status, talents, gold, equipment, spells, professions, current location, and an event in the game;
    storing the game related information in a character data file on the game computer;
    reading the game related information from the character data file;
    requesting to upload the game related information to a remote server;
    notifying whether the game related information may be uploaded based on a load on the remote server;
    uploading the game related information to the remote server;
    storing the game related information to a character subscriber database on the remote server;
    reading the game related information from the character subscriber database;

determining whether to transfer a newsletter based on time, elapsed time since a newsletter has been sent, the game related information, or upon determining that the game player needs guidance;

retrieving articles from an article database based on the characters that the game player selected and on the game related information;

determining whether the game player has read any of the retrieved articles and whether the game player has not heeded advice contained in the retrieved articles that have been read;

generating the newsletter on the remote server that is tailored for the game player based on the game related information and based on which characters the game player selected to receive advice;

incorporating the game related information and the retrieved articles into the newsletter, wherein the retrieved articles that have been read by the game player are not incorporated in the newsletter unless the game player has not heeded advice contained in the retrieved articles that have been read by the game player; and transferring the newsletter to the game player, wherein transferring the newsletter to the game player includes e-mailing the newsletter or hyperlinks to the newsletter to the game player; uploading the newsletter or hyperlinks to the newsletter directly to the game computer; allowing the newsletter or hyperlinks to the newsletter to be downloaded onto the game computer; or making the newsletter available over a website.

12. A system for preparing a targeted newsletter, comprising:

a monitor program running on a game computer that collects game related information during a game while a game player plays the game the game related information comprising at least one game character; and stores the game related information in a character data file on the game computer;

reads the game related information from the character data file;

requests to upload the game related information to a remote server; and, notifies whether the game related information may be uploaded based on a load on the remote server;

a client uploader program running on the game computer that uploads the game related information to a remote server; and stores the game related information to a character subscriber database on the remote server;

reads the game related information from the character subscriber database;

determines whether to transfer a newsletter based on time, elapsed time since a newsletter has been sent, the game related information, or upon determining that the game player needs guidance;

retrieves articles from an article database based on the characters that the game player selected and on the game related information;

determines whether the game player has read any of the retrieved articles and whether the game player has not heeded advice contained in the retrieved articles that have been read;

generates the newsletter on the remote server that is tailored for the game player based on the game related information and based on which characters the game player selected to receive advice;

incorporates the game related information and the retrieved articles into the newsletter, wherein the retrieved articles that have been read by the game player are not incorporated in the newsletter unless the game player has not heeded advice contained in the retrieved articles that have been read by the game player; and, transfers the newsletter to the game player, wherein transferring the newsletter to the game player includes e-mailing the newsletter or hyperlinks to the newsletter to the game player; uploading the newsletter or hyperlinks to the newsletter directly to the game computer; allowing the newsletter or hyperlinks to the newsletter to be downloaded onto the game computer; or making the newsletter available over a website.

13. The system of claim 12, further comprising:

an upload handler running on the remote server that receives the game related information from the client uploader program and stores the game related information in a character subscriber database on the remote server, wherein the monitor program stores the game related information in a character data file;

the client uploader program reads the character data file and uploads the game related information to the upload handler; and the newsletter generator reads the game related information in the character subscriber database.

14. The system of claim 13, wherein:

the client uploader program requests to upload the game related information to the remote server; and the upload handler informs the client uploader program whether the game related information may be uploaded based on a load of the remote server.

15. The system of claim 12, wherein the game related information includes at least one of the group consisting of a character's name, level, race, class, stats, status, talents, gold, equipment, spells, professions, current location, and an event in the game.

16. The system of claim 12, wherein the newsletter generator determines whether to transfer the newsletter based on time, elapsed time since a newsletter has been sent, the game related information, or upon determining that the game player needs guidance.

17. The system of claim 12, wherein the newsletter generator determines whether the game player has read any of the retrieved articles and whether the game player has not heeded advice contained in the retrieved articles that have been read.

18. The system of claim 12, further comprising:

an interface for allowing the game player to select characters for which the game player would like to receive advice, wherein the newsletter generator retrieves articles also based on the characters the game player selected.

19. The system of claim 12, wherein the newsletter generator includes articles or hyperlinks to articles in the newsletter that have not been read by the game player or that contain advice that the game player has not heeded; and the newsletter generator incorporates the game related information into the newsletter.

20. The system of claim 12, wherein the newsletter generator transfers the newsletter to the game player bye-mailing the newsletter or hyperlinks to the newsletter to the game player; uploading the newsletter or hyperlinks to the newsletter directly to the game computer; allowing the newsletter or hyperlinks to the newsletter to be downloaded onto the game computer; or making the newsletter available over a website.

21. The system of claim 12, wherein the newsletter generator comprises a newsletter generator that creates a newsletter that includes a custom map or a hyperlink to a custom map that includes identifiers for locations chosen for the game player based on the game related information.

22. A system for preparing a targeted newsletter, comprising:
- a monitor program running on a game computer that
  - collects game related information during a game while a game player plays the game and
  - stores the game related information in a character data file on the game computer;
- an interface for allowing the game player to select characters for which the game player would like to receive advice;
- a client uploader program running on the game computer that
  - reads game related information from the character data file;
  - requests to upload the game related information to the remote server; and
  - uploads the game related information to a remote server;
- an upload handler running on the remote server that
  - informs the client uploader program whether the game related information may be uploaded based on a load of the remote server;
  - receives the game related information from the client uploader program; and
  - stores the game related information in a character subscriber database on the remote server; and
- a newsletter generator running on the remote server that
  - reads the game related information in the character subscriber database;
  - determines whether to transfer the newsletter based on time, elapsed time since a newsletter has been sent, the game related information, or upon determining that the game player needs guidance;
  - retrieves articles from an article database based on the game related information and on the characters the game player selected;
  - determines whether the game player has read any of the retrieved articles and whether the game player has not heeded advice contained in the retrieved articles that have been read;
  - creates a newsletter that includes the articles or hyperlinks to the articles that have not been read by the game player or that contain advice that the game player has not heeded;
  - incorporates the game related information into the newsletter; and
  - transfers the newsletter to the game player bye-mailing the newsletter or hyperlinks to the newsletter to the game player; uploading the newsletter or hyperlinks to the newsletter directly to the game computer; allowing the newsletter or hyperlinks to the newsletter to be downloaded onto the game computer; or making the newsletter available over a website;
- wherein the game related information includes at least one of the group consisting of a character's name, level, race, class, stats, status, talents, gold, equipment, spells, professions, current location, and an event in the game.

* * * * *